United States Patent [19]

Hatin

[11] 4,374,434
[45] Feb. 15, 1983

[54] VIDEO DISC STYLUS CARTRIDGE WITH PROTECTIVE MEMBER

[75] Inventor: Donald T. Hatin, Indianapolis, Ind.

[73] Assignee: RCA Corporation, New York, N.Y.

[21] Appl. No.: 190,274

[22] Filed: Sep. 24, 1980

[51] Int. Cl.³ .............................................. G11B 3/46
[52] U.S. Cl. ................................................... 369/170
[58] Field of Search ................ 369/170, 171, 172, 126

[56] References Cited

U.S. PATENT DOCUMENTS 655,556  8/1900  Johnson .............................. 369/170
4,077,050  2/1978  Dholakia ............................ 369/170

Primary Examiner—John W. Shepperd
Attorney, Agent, or Firm—E. M. Whitacre; J. S. Tripoli

[57] ABSTRACT

In a record playback cartridge of the type having a cartridge body, a stylus arm mounted within the body, a pickup stylus mounted on one end of the arm and an elongated spring-like flylead member connected between the cartridge body and a certain point in the vicinity of the stylus, the flylead normally assuming a bow-like shape, a stop member is connected between opposing walls of the cartridge body in the vicinity of the flylead to prevent the disturbance of the bow-like shape of the flylead.

4 Claims, 3 Drawing Figures

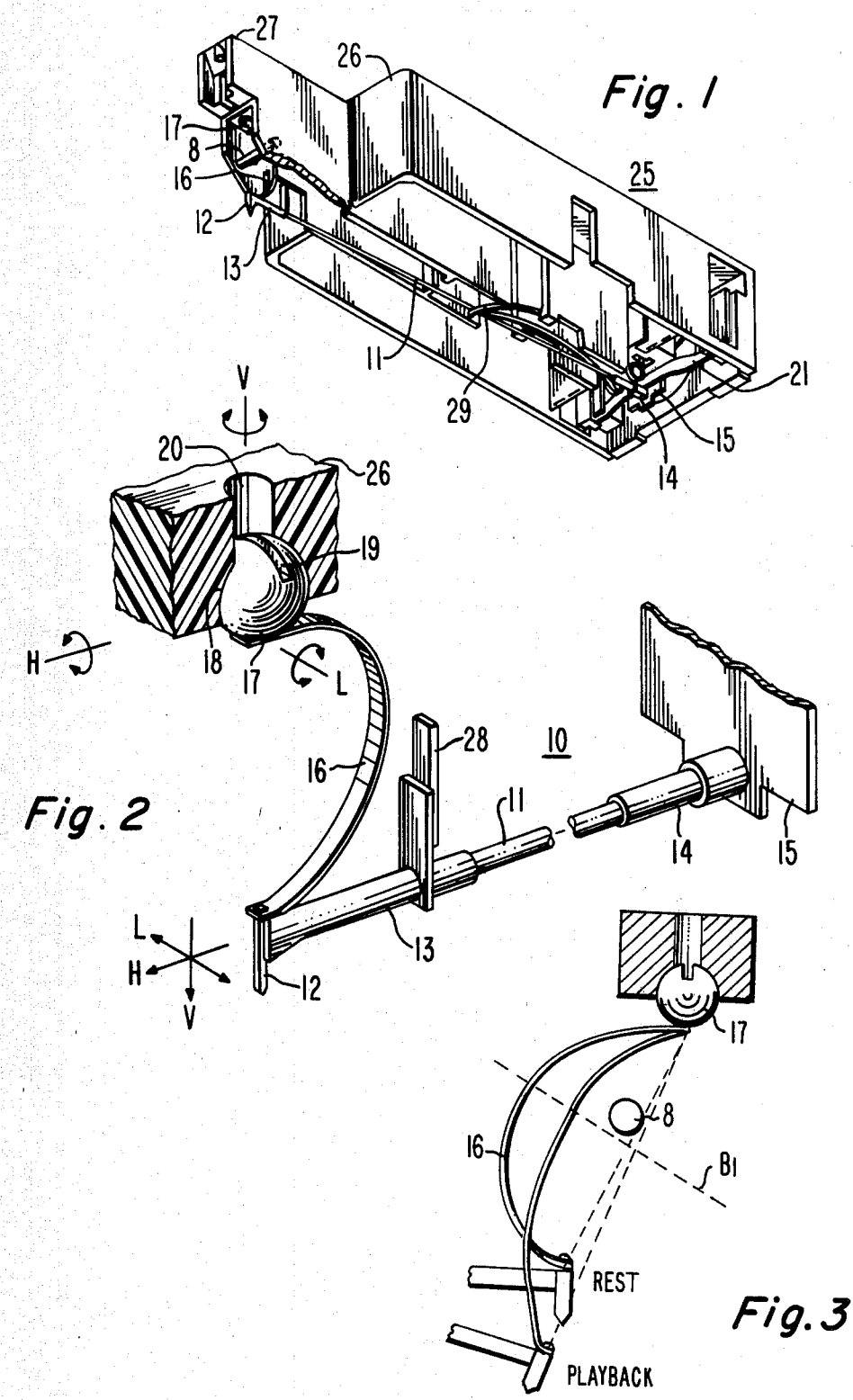

VIDEO DISC STYLUS CARTRIDGE WITH PROTECTIVE MEMBER

The present invention relates generally to certain video disc cartridges and more particularly to a protective member for this type of cartridge.

Video disc playback systems comprise apparatus for recovering prerecorded information from disc records. The density of information on such discs is extremely high. To achieve the high information density the information is recorded in spiral or concentric tracks having a density which may be as high as 10,000 tracks per inch.

Where the tracks are formed as a spiral groove, a concomitant result is that the groove depth is often very shallow. The shallow groove cannot be dependably relied upon to pull the weight of a signal pickup stylus assembly across the entire recorded surface of the disc record. Therefore the stylus assembly is compliantly mounted in a carriage mechanism which translates the stylus assembly radially across the disc in proper time relationship with the recovered signal. The stylus assembly is sometimes contained in a cartridge, which cartridge is removable from the carriage mechanism for replacement purposes.

Integral to the carriage mechanism in some systems are several sensor and transducer elements which cooperate with the stylus arm. The sensor elements may be part of a servo system for controlling the rate at which the carriage mechanism translates radially across the disc. Since the stylus assembly is compliantly mounted to the carriage mechanism, the stylus may move radially across the disc relative to the carriage. The relative stylus-carriage movement is detected and used to control the carriage speed. The transducer elements, on the other hand, are magnetically coupled to the stylus arm to impart limited impulsive motion to the stylus for the production of special effects such as stop motion for example. Due to the extremely close spacing of the information tracks on the disc record and due to the signal pickup stylus cartridges being interchangeable, it can readily be appreciated that reliable performance of the player mechanism depends upon proper alignment of each stylus assembly within its respective cartridge.

Certain video disc systems utilize cartridges wherein a thin, flat, elongated conductive leaf spring member or flylead is used to provide an electrical connection between a pickup stylus electrode and another electrode coupled to pickup circuitry and also to provide proper vertical forces and side bias forces on the stylus relative to the record. That is, the conductive flylead also functions as a spring member to apply tracking forces to the stylus and to set up the initial proper lateral alignment of the stylus assembly.

Typically, the vertical or tracking force as well as the side bias forces are set at the factory during cartridge assembly. The spring-like flylead is set into a "C" or bow shape during assembly and adjustments are made at the top of the bow to set the vertical tracking force. Similarly, the end of the flylead at the top of the bow is adjusted to set the side bias forces on the stylus. The tracking force is measured in tens of milligrams and the side bias forces are to be nominally zero mg plus or minus two or three mg.

These force settings, which are accomplished through adjustments to the bow-shaped flylead, are extremely important to overall player performance. If the tracking pressure is not within acceptable limits, the stylus will not reliably follow the information track and therefore the carriage servo system will not function smoothly and reliably. If the side bias forces are out of acceptable limits, the previously mentioned transducer elements will not move the stylus in the desired manner, i.e., groove skipping will be unpredictable. Thus, the stylus assembly alignment and force settings, which are all related to the bow-shaped flylead, are critical to the proper performance of the entire system.

In cartridges of the type under consideration, a spring mechanism is used to hold the stylus arm assembly within the confines of the cartridge whenever the cartridge is not in the player carriage. In the out-of-carriage condition, the flylead is still in a blow-like shape. It has been discovered that under certain severe shock conditions, typically while out of the carriage and, occurring during shipping or handling, the bow-shaped flylead may become inverted. That is, the bow or "C" shape of the flylead between the stylus electrode and pickup circuit electrode may take the form of a somewhat "S" shape between the two ends of the flylead as a result of severe mechanical shock conditions. Even though the thin flexible spring-like flylead can be manually pushed back into the desired "C" shape, it turns out that the critical vertical and side bias forces very often will fall outside of the acceptable factory set limits as a result of overstressed conditions. In such cases, the entire video disc system, as far as the consumer is concerned, becomes inoperative or, at the very least, unacceptable.

Thus it becomes very desirable to provide a means whereby it is nearly impossible for the flylead to change its desired shape under the most severe mechanical shock anticipated.

In accordance with the present invention, an improvement is provided for a playback cartridge assembly. The cartridge assembly comprises a cartridge body, a stylus arm mounted in the body, a pickup stylus mounted on the arm, and an elongated spring-like flylead member connected between the stylus and the cartridge body, the flylead normally has a bow shape. The improvement comprises a stop member connected between two opposing walls of the cartridge body in the vicinity of but normally non-contacting with the flylead member for preventing the disturbance of the bow-like shape of the flylead.

In the drawing:

FIG. 1 is a perspective drawing of one type of video disc signal pickup cartridge including the present improvement;

FIG. 2 is a perspective drawing of the signal pickup stylus-stylus arm assembly mounted within the FIG. 1 cartridge; and FIG. 3 is a diagram depicting the preferred location of the improvement in respect of a cartridge of the type shown in FIG. 1.

Referring to FIGS. 1 and 2, the cartridge 25 includes an enclosure or body 26 for supporting and protecting the relatively fragile signal pickup stylus arm assembly 10. The body 26 is a rigid non-deformable material having an elongated front section 27. Mounted in the body 26 is a signal pickup stylus 12 (with an electrode on one face thereof) secured to a stylus holder 13 which in turn is attached to a first end of the stylus arm 11. The other end of the stylus arm is attached to a plate 15 by a compliant coupler 14 which allows the stylus arm to have relatively free pivotal movement about the connection to plate 15 at least over a limited range of motion. The plate 15 is secured to body 26 by the elastic diaphragm 21 which permits limited longitudinal motion of the stylus arm.

A thin, flat, elongated leaf spring or flylead 16 (usually conductive) has a first end attached to the stylus 12 or stylus holder 13 and a second end secured to the cartridge body 26 by an adjusting member 17 rotatably secured in the body 26. Adjusting member 17 may be spherically shaped and constrained within a generally close fitting spherical cavity 18 within a portion of the body material 26. The fit between the member 17 and cavity 18 is sufficiently tight that normal motion of the flylead during playback operations will not cause rotation therebetween but sufficiently loose to permit desired rotation of the member by introduction of a tool into the depression 19 and either rotating the tool about the generally vertical axis "V" and/or rocking the tool within the hole 20 provided in the enclosure 26. Alternatively member 17 may be cylindrically shaped in a cylindrical cavity 18 with adjustment accomplished by rotating the cylinder about the lateral axis, "L", and/or sliding the cylinder within the cavity 18 along the lateral axis.

The flylead leaf spring 16 serves to apply a predetermined pressure between the stylus and the disc record during record playback, and provides electrical connection between the signal pickup stylus electrode and member 17 which serves as an electrode which is coupled to video processing circuitry (not shown). The flylead may also be used as one electrode of a position sensitive capacitor for determining the relative position of the stylus with respect to the sidewalls of the cartridge or the carriage. For the latter application, one electrode of an air dielectric variable capacitance is fixed to the carriage, the other capacitor electrode is fixed to the stylus arm. As the arm moves laterally (the direction designated "L" in the drawing) the change in capacitance is detected to indicate the relative change in stylus carriage position.

The item 28 attached to the stylus holder is a magnet which cooperates with electromagnets secured to the carriage to selectively impart lateral motion to the stylus end of the stylus arm.

The flylead 16 is sufficiently compliant to permit the stylus to have relatively free lateral motion and to enable it to track an eccentric groove. Though compliant, the flylead is sufficiently stiff to position the stylus in space laterally, when no lateral forces are applied to the stylus. This lateral positioning is accomplished by orienting the member 17, e.g., to effect a limited rightward lateral stylus position change, the member 17 is rotated clockwise about the vertical axis. Similarly the stylus disc pressure may be altered by effecting a change in the flylead arc deformation by rotating member 17 about the lateral axis. Adjustments are made, during factory assembly operations, on member 17 to achieve the desired vertical tracking pressure and the side bias force as described above.

Also shown in FIG. 1 is a spring member 29 which is arranged to hold the stylus assembly 10 within the body 26 when the cartridge 25 is out of the player carriage. When the lid on the player carriage cartridge compartment is closed, a member attached to the lid enters the cartridge body 26 to defeat the spring 29 and the stylus arm is permitted to rest on an arm lifting/lowering mechanism.

The improvement to the cartridge assembly 25 is also shown in FIG. 1. A stop member 8 is positioned in the front end of the cartridge body 26. The stop member 8 is an elongated member connected between two opposing walls of the body 26 in the vicinity of the flylead 16 but not normally making contact therewith. Stop member 8 may be molded into the cartridge body or may comprise a pin inserted into molded in holes in the cartridge body, or, may even be press fit into place. Preferably the stop member 8 is formed from material similar to the material used for the cartridge body. In any event, the stop member should be electrically non-conductive to avoid adverse affects on the capacitive pickup system and the carriage servo mechanism previously mentioned.

The stop member 8 is positioned such that in the event of severe mechanical stress it is effective to prevent the flylead 16 from inverting. Such mechanical stress can occur, for example, when the cartridge assembly is dropped onto a hard surface.

FIG. 3 diagrammatically shows the desired position for stop member 8. When the stylus arm is in the rest position, the flylead 16 has its normal bow-like shape and the location of stop member 8 is such that its longitudinal axis is on a line between the bow-like shape (at rest) and a plane including the flylead connection points near the stylus at one end and the ball 17 at the other end. If a bisecting plane B1 is drawn (as in FIG. 3) through the connecting plane, it will be seen that the stop member lies in the upper left quadrant.

During playback, the stylus arm is lowered onto the disc record and now the flylead 16 assumes the modified bow-like shape shown in FIG. 3 for the playback position. If another imaginary plane is constructed connecting the end points of the flylead at this time, the longitudinal axis of the stop member 8 is still in a line between the second plane and the modified bow-like shape. If another bisecting plane were to be imagined, relative to this second plane, then the stop member would still be in the upper left quadrant.

The location of the stop member 8 is such that it will not contact or otherwise interfere with the normal operation of the cartridge at rest or in the playback position, yet it is effective to prevent flylead inversion.

One of the advantages of the present arrangement is that the stop member 8 is permanently in place (after initial assembly) and no further adjustments or precautions are necessary for it to accomplish its mission.

What is claimed is:

1. In a record playback cartridge assembly of the type comprising: a cartridge body, a stylus arm mounted within said cartridge body; a pickup stylus mounted on one end of said arm, the other end of said arm being compliantly coupled to said cartridge body; and an elongated electrically conductive spring-like flylead member, connected at one end thereof to said cartridge body and at the other end thereof to a certain point in the vicinity of said stylus for coupling electrical signals representing recorded information during record playback, said flylead normally assuming a bow-like shape extending away from the end connections of said flylead and toward said other end of said arm, said flylead being subject to disturbance of said bow-like shape during handling of said cartridge at times other than when said cartridge is positioned for record playback, the improvement comprising:

a stop member formed from an electrically non-conductive material and connected between two opposing walls within the confines of said cartridge body on the side of said flylead bow-like shape toward said one end of said arm in the vicinity of but non-contacting with said flylead member for preventing the inversion of said bow-like shape of said flylead during handling of said cartridge, said stop member being positioned so as not to touch said flylead at any time during record playback.

2. The improvement according to claim 1 wherein said stylus arm has a rest position and a playback position and wherein said flylead has said bow-like shape when said arm is in said rest position and a modified bow-like shape when said arm is in said playback position and wherein said stop member is positioned to be non-contacting with said flylead when said arm is in both said rest position and said playback position.

3. The improvement according to claim 2 wherein said stop member is an elongated structure formed about a longitudinal axis and wherein said longitudinal axis is on a line falling between the bow-like shape of said flylead and a plane including said certain point and the point of connection of said flylead to said cartridge body during the rest condition of said arm.

4. The improvement according to claim 3 wherein said longitudinal axis line falls between said modified bow-like shape and the second plane including said certain point and the connection point of said flylead to said cartridge body during the playback condition of said arm.

* * * * *